United States Patent
Shakoor et al.

(10) Patent No.: US 12,222,864 B2
(45) Date of Patent: Feb. 11, 2025

(54) DATA CONVERSION APPARATUS, SYSTEM, AND METHOD

(71) Applicant: Hitachi, Ltd., Tokyo (JP)

(72) Inventors: Naushad Shakoor, Tokyo (JP); Koichi Okita, Tokyo (JP); Yuta Sekiguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/288,860

(22) PCT Filed: Mar. 7, 2022

(86) PCT No.: PCT/JP2022/009818
§ 371 (c)(1),
(2) Date: Oct. 30, 2023

(87) PCT Pub. No.: WO2022/244397
PCT Pub. Date: Nov. 24, 2022

(65) Prior Publication Data
US 2024/0202128 A1 Jun. 20, 2024

(30) Foreign Application Priority Data
May 20, 2021 (JP) .................. 2021-085405

(51) Int. Cl.
*G06F 12/08* (2016.01)
*G06F 12/0875* (2016.01)

(52) U.S. Cl.
CPC .................. *G06F 12/0875* (2013.01)

(58) Field of Classification Search
CPC .................................. G06F 12/0875
See application file for complete search history.

(56) References Cited

U.S. PATENT DOCUMENTS 10,706,155 B1 7/2020 Veselov et al.
2005/0216637 A1* 9/2005 Smith ................. G06F 12/0815
711/146

FOREIGN PATENT DOCUMENTS

JP 2020-057091 A 4/2020
JP 2020-126533 A 8/2020
WO 2020/162099 W 8/2020

OTHER PUBLICATIONS

International Search Report of PCT/JP2022/009818 dated May 17, 2022.

(Continued)

*Primary Examiner* — Jae U Yu
(74) *Attorney, Agent, or Firm* — MATTINGLY & MALUR, PC (57) ABSTRACT

Data can be rapidly and flexibly converted. A data conversion apparatus stores monitoring target management information in which a monitoring target is associated with a controller type representing a type of a controller configured to control the monitoring target, and data conversion rule information in which a data set in units of the controller type is registered, the data set in units of the controller type defining a conversion rule indicating a data conversion method for the controller type. A calculation unit loads the data conversion rule information into the cache memory, specifies a monitoring target corresponding to data received from an edge device, specifies a controller type corresponding to the specified monitoring target by referring to the monitoring target management information, reads a conversion rule corresponding to the specified controller type from the cache memory, and converts the data using the conversion rule.

10 Claims, 6 Drawing Sheets

(56) References Cited

OTHER PUBLICATIONS

Australian Office Action received in corresponding Australian Application No. 2022276596 dated Oct. 10, 2024.

* cited by examiner

| | BEFORE CONVERSION | | AFTER CONVERSION |
|---|---|---|---|
| (1) RESOLUTION ADJUSTMENT<br>RESOLUTION OF VALUE IS ADJUSTED. | T = 1472 | ⇒ | T = 92<br>(VALUE IS DIVIDED BY 16) |
| (2) KEY MAPPING<br>KEY IS CONVERTED TO BE HUMAN-READABLE. | T = 1472 | ⇒ | Temperature = 92<br>(T OF KEY IS MAPPED TO TEMPERATURE.) |
| (3) MEASUREMENT UNIT ADDITION<br>UNIT IS ADDED FOR VALUE. | T = 1472 | ⇒ | Temperature = 92°F |
| (4) MEASUREMENT UNIT CONVERSION<br>UNIT OF VALUE IS CONVERTED. | T = 1472 | ⇒ | Temperature = 33°C |
| (5) DTC DECODING<br>DTC IS DECODED AND KEY AND VALUE ARE CONVERTED INTO HUMAN-READABLE MESSAGE. | COS=254 | ⇒ | CompressorOperatingState = Emergency Button Pressed |

DATA CONVERSION APPARATUS, SYSTEM, AND METHOD

TECHNICAL FIELD

The present disclosure relates to processing of IoT data collected from a monitoring target such as an industrial machine.

BACKGROUND ART

In recent years, an importance of utilizing Internet of Things (IoT) data generated by an industrial machine (hereinafter, also referred to as an "asset") including various sensors in combination with advanced information technology (IT) such as machine learning or artificial intelligence (AI) has increased.

In a case of monitoring a failure or the like in an asset using IoT data, it is required to rapidly detect a failure or the like and perform sign diagnosis of monitoring the presence or absence of a sign of a failure or the like.

Generally, IoT data is not used as raw data, but is used after being converted according to a predetermined conversion rule (see PTL 1).

CITATION LIST

Patent Literature

PTL 1: JP2020-126533A

SUMMARY OF INVENTION

Technical Problem

In order to implement rapid use of the IoT data, rapid IoT data conversion is also desired.

A conversion rule for the IoT data is created by a data scientist, and is updated in response to a change in a trend in many cases. Generally, update of the conversion rule involves modification and deployment of a system. However, when the conversion rule is frequently changed, it is desirable that the conversion rule can be flexibly changed without modifying or deploying.

An object of the disclosure is to provide a technique enabling rapid and flexible conversion of data.

Solution to Problem

A data conversion apparatus according to one aspect of the disclosure is a data conversion apparatus for converting data acquired by an edge device attached to a monitoring target. The data conversion apparatus includes: a storage unit configured to store monitoring target management information in which the monitoring target is associated with a controller type representing a type of a controller configured to control the monitoring target, and data conversion rule information in which a data set in units of the controller type is registered, the data set in units of the controller type defining a conversion rule indicating a data conversion method for the controller type; and a calculation unit including a cache memory and configured to be capable of executing a software program for implementing data conversion using the information stored in the storage unit. The calculation unit loads the data conversion rule information into the cache memory, specifies a monitoring target corresponding to the data received from the edge device, specifies a controller type corresponding to the specified monitoring target by referring to the monitoring target management information, reads a conversion rule corresponding to the specified controller type from the cache memory, and converts the data using the conversion rule.

Advantageous Effects of Invention

According to one aspect of the disclosure, it is possible to flexibly update a conversion rule in units of a data set, and to rapidly convert data.

DESCRIPTION OF EMBODIMENTS

Hereinafter, an embodiment of the invention will be described with reference to the drawings.

Figure 1:
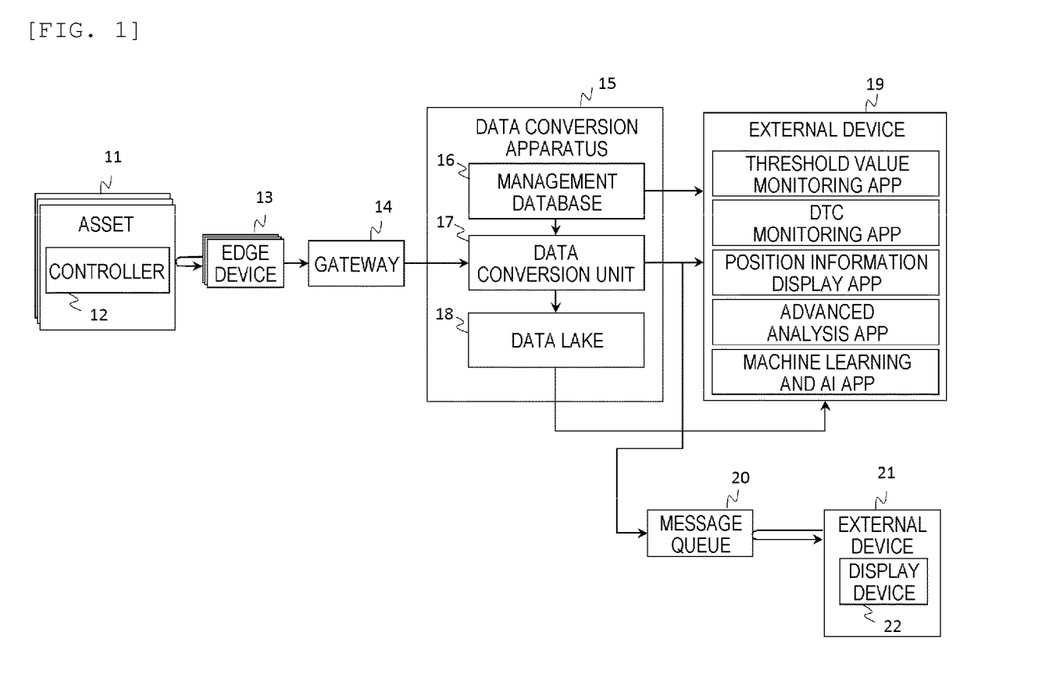
FIG. 1 is a block diagram showing a data processing system.

FIG. 1 is a block diagram showing a data processing system.

The data processing system includes an edge device 13 and a data conversion apparatus 15.

An asset 11 is an industrial machine or the like to be monitored. There may be a plurality of assets 11. The asset 11 includes a controller 12. The controller 12 is a device for monitoring and controlling the asset 11. The controller 12 acquires data from various sensors (not shown) of the asset 11, and the like. The data transmitted from the controller 12 is unprocessed raw data collected at the asset 11.

The edge device 13 is installed on the asset 11, acquires data from the controller 12, and transmits the raw data to the data conversion apparatus 15 as it is. The raw data from the edge device 13 is received by the data conversion apparatus 15 via a gateway 14. The gateway 14 is provided on a cloud and transfers the data from the edge device 13 to the data conversion apparatus 15.

The data conversion apparatus 15 includes a management database 16, a data conversion unit 17, and a data lake 18. The management database 16 is a database (hereinafter, also referred to as "DB") that stores various pieces of management data. The data conversion unit 17 is a data conversion engine that converts the raw data received from the edge device 13 based on the various pieces of management data in the management database 16. The converted data converted by the data conversion unit 17 is transmitted to an external device 19 and a message queue 20.

How the data conversion apparatus 15 converts the data is not particularly limited, and in the present embodiment, the data conversion apparatus 15 converts the data into contextualized and meaningful data. The raw data received by the data conversion apparatus 15 and the converted data converted by the data conversion apparatus 15 are also stored in the data lake 18.

The external device 19 receives the converted data from the data conversion apparatus 15 and is used for processing of various applications. Hereinafter, the application may be abbreviated as an app. A method of using converted data by an app is not particularly limited, and an app of the external device 19 is, for example, a threshold value monitoring app, a DTC monitoring app, a position information display app, an advanced analysis app, or a machine learning and AI app.

The threshold value monitoring app compares a value of the converted data with a predetermined threshold value, and detects a state change such as a failure of the asset 11 or a sign thereof. The DTC monitoring app detects an abnormality in the asset 11 based on an error message converted from a diagnostic trouble code (DTC). The position information display app uses position information converted from GPS data. The advanced analysis app is an app that applies advanced analysis to the converted data. For example, the advanced analysis app stores the converted data in time series and analyzes the time series converted data. The machine learning and AI app is an app that generates a prediction model by learning training data and performs prediction using the prediction model. The converted data is used as learning data or input data for the prediction model. The various apps can appropriately acquire and use management data registered in the management database 16 and data stored in the data lake 18.

The converted data may be used not only by an app but also directly by a person. For example, the converted data is a message including a phrase or sentence that can be read and understood by a person, and may be registered in the message queue 20. The converted data registered in the message queue 20 may be sequentially extracted by an external device 21 and displayed on a display device 22. A user can read the message displayed on the display device 22 and take any appropriate action.

Figure 2:
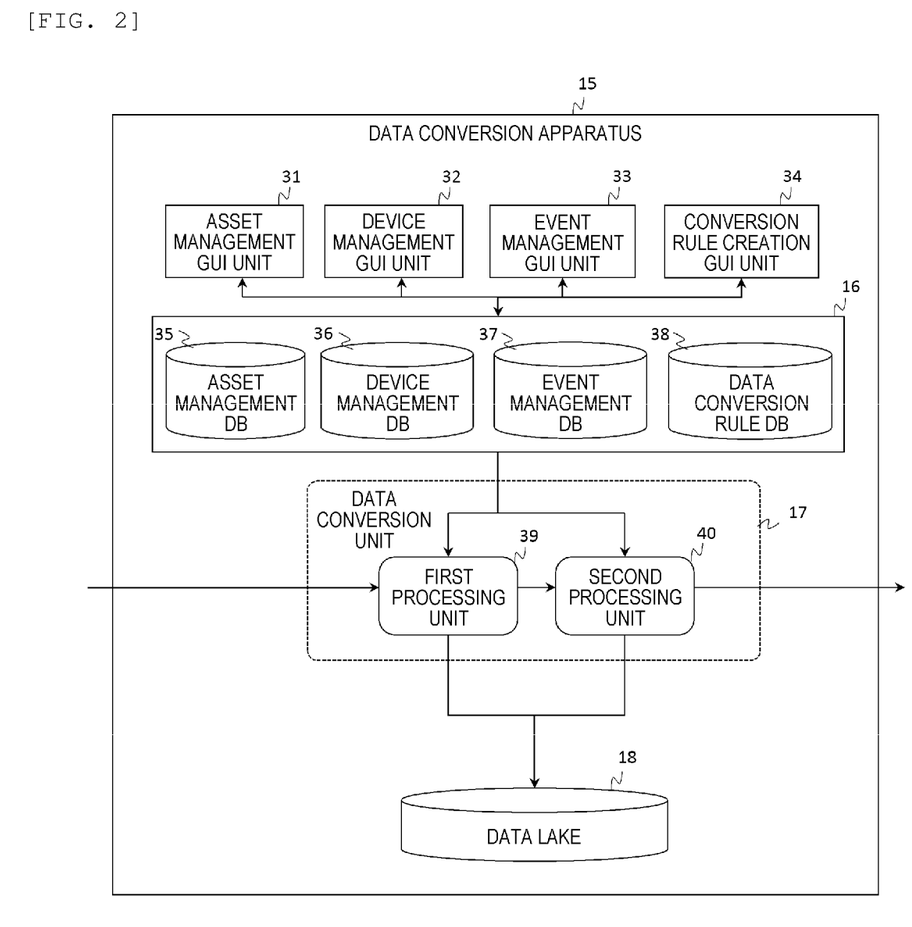
FIG. 2 is a block diagram showing a functional configuration of a data conversion apparatus.
Figure 3:
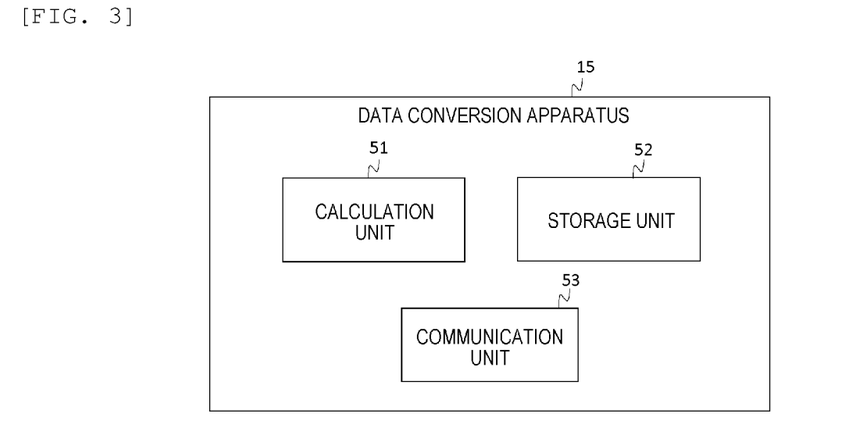
FIG. 3 is a block diagram showing a hardware configuration of the data conversion apparatus.

FIG. 2 is a block diagram showing a functional configuration of the data conversion apparatus 15. FIG. 3 is a block diagram showing a hardware configuration of the data conversion apparatus 15.

Referring to FIG. 2, the data conversion apparatus 15 includes an asset management GUI unit 31, a device management GUI unit 32, an event management GUI unit 33, and a conversion rule creation GUI unit 34 in addition to the management database 16, the data conversion unit 17, and the data lake 18. Referring to FIG. 3, the data conversion apparatus 15 includes a calculation unit 51, a storage unit 52, and a communication unit 53 as hardware.

The storage unit 52 is a storage device that stores data in a writable and readable manner. On the storage unit 52, the management database 16 and the data lake 18 shown in FIG. 2 are constituted. The storage unit 52 stores a software program for implementing various types of processing of the data conversion apparatus 15. The calculation unit 51 is a processor that executes processing of a software program stored in the storage unit 52, and executes desired processing using various pieces of data in the storage unit 52. The asset management GUI unit 31, the device management GUI unit 32, the event management GUI unit 33, the conversion rule creation GUI unit 34, and the data conversion unit 17 shown in FIG. 2 are implemented by the calculation unit 51 executing a software program. The calculation unit 51 includes a cache memory (not shown) and is used for data conversion processing. The communication unit 53 is a communication device that receives data, which is used by the calculation unit 51 for processing, in a wired or wireless manner and transmits data processed by the calculation unit 51 in a wired or wireless manner.

The management database 16 includes an asset management DB 35, a device management DB 36, an event management DB 37, and a data conversion rule DB 38. The data conversion unit 17 includes a first processing unit 39 and a second processing unit 40.

The asset management GUI unit 31 provides a graphical user interface (GUI) for registering asset management data for managing each asset 11 to be monitored by the user. The asset management data registered by the user is stored in the asset management DB 35. The asset management data includes information in which an asset serial number for identifying the asset 11 is associated with a control type that indicates a type of the controller 12 of the asset 11. The device management GUI unit 32 provides a GUI for the user to register device management data for managing the edge device 13 provided in each asset 11. The device management data registered by the user is stored in the device management DB 36. The event management GUI unit 33 provides a GUI for the user to register event management data related to an event. The event management data is, for example, a threshold value for determining occurrence of an event based on data. The event management data registered by the user is stored in the event management DB 37. The conversion rule creation GUI unit 34 provides a GUI for the user to register a data conversion rule. The data conversion rule registered by the user is stored in the data conversion rule DB 38. The data conversion rule includes information in which the controller type of the controller 12 is associated with a data conversion rule used for conversion of the raw data acquired from the asset 11 corresponding to the controller type.

Figure 4:
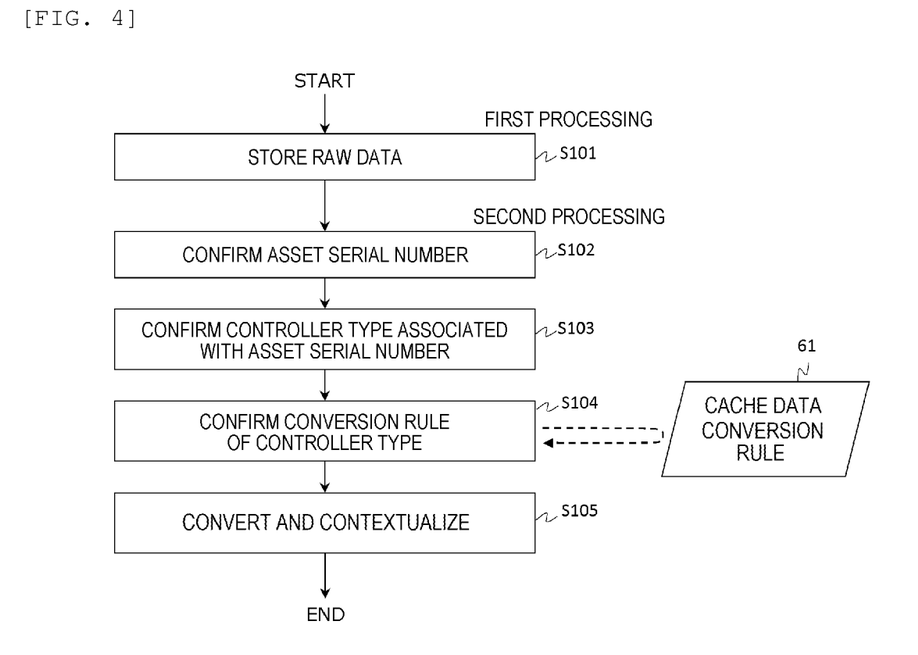
FIG. 4 is a flowchart showing processing executed by a data conversion unit.

FIG. 4 is a flowchart showing processing executed by the data conversion unit 17.

Before starting the processing in FIG. 4, the data conversion unit 17 loads the data conversion rule stored in the data conversion rule DB 38 as a data conversion rule cache 61 into the cache memory. A format of the data conversion rule is, for example, a JavaScript object notation (JSON) format. JavaScript is a registered trademark. Thereafter, the unclassified raw data is input to the data conversion unit 17. As an example, the raw data is a JSON format message queue telemetry transport (MQTT) message.

The raw data is converted in real time by the processing shown below.

Figure 5:
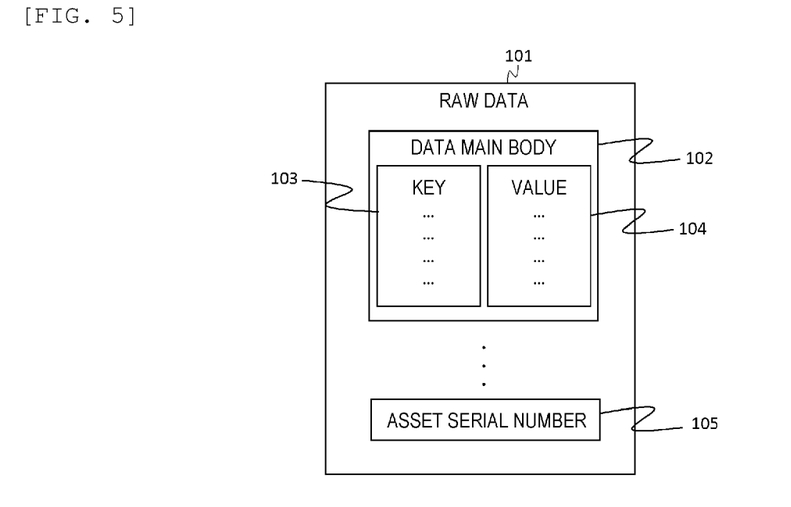
FIG. 5 is a diagram showing an example of raw data input to the data conversion unit.

In step S101, in the data conversion unit 17, the first processing unit 39 stores the received raw data in the data lake 18. FIG. 5 is a diagram showing an example of the raw data input to the data conversion unit 17. Raw data 101 includes a data main body 102 and an asset serial number 105. The data main body 102 includes a key 103 and a value 104. The asset serial number 105 is a serial number for identifying the asset 11 from which the raw data 101 is acquired. The key 103 included in the data main body 102 indicates a data item, and the value 104 indicates a value of the data item.

In step S102, the second processing unit 40 confirms the asset serial number 105 in the raw data 101 received from the edge device 13. In step S103, the second processing unit 40 refers to the asset management data and confirms the controller type of the controller 12 corresponding to the asset serial number.

In step S104, the second processing unit 40 acquires, from the data conversion rule cache 61, a data conversion rule used for conversion of the data acquired from the asset 11 in which the controller 12 of such a controller type is installed.

In step S105, the second processing unit 40 converts and contextualizes the raw data using the data conversion rule. The converted data is in the JSON format as an example.

Thus, the data conversion is performed using the data conversion rule in the data conversion rule cache 61, which enables rapid and real-time conversion.

Figure 6:
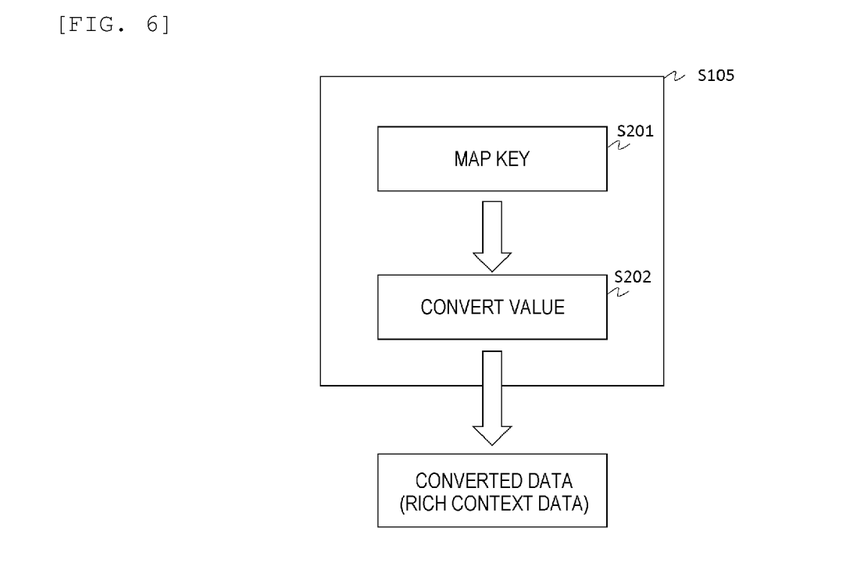
FIG. 6 is a flowchart showing detailed processing of step S105.

FIG. 6 is a flowchart showing detailed processing in step S105.

In step S201, the second processing unit 40 converts the key 103 included in the data main body 102 of the raw data 101 according to the data conversion rule. Next, in step S202, the second processing unit 40 converts the value 104 included in the data main body 102 according to the data conversion rule. The converted data obtained by converting the key 103 and/or the value 104 is output as rich context data.

Figure 7:
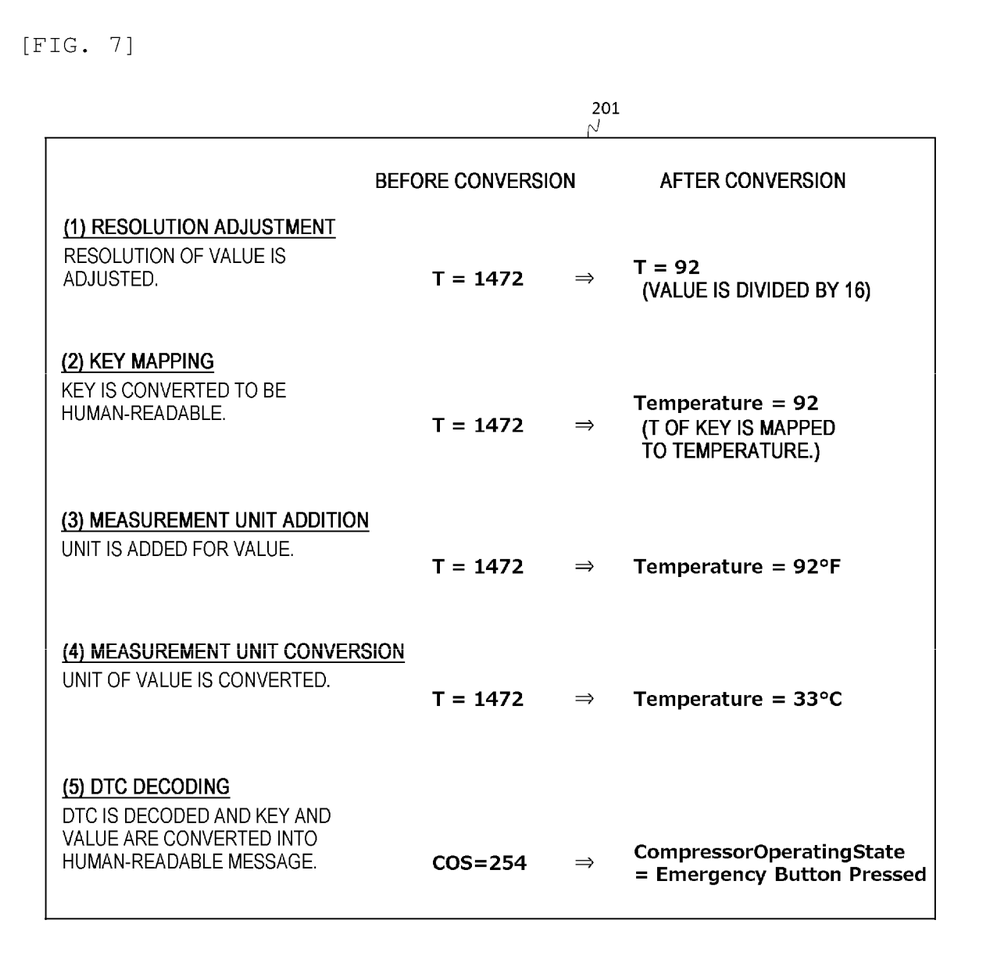
FIG. 7 is a table showing data conversion.

FIG. 7 is a table showing the data conversion.

The table 201 shows various conversion states. In an example of FIG. 7, the conversion type includes (1) resolution adjustment, (2) key mapping, (3) measurement unit addition, (4) measurement unit conversion, and (5) DTC decoding.

(1) The resolution adjustment is data conversion in which a resolution of the value 104 is adjusted. (2) The key mapping is data conversion in which the key 103 is converted into a human-readable phrase. (3) The measurement unit addition is data conversion in which a unit of the value 104 is added. (4) The measurement unit conversion is data conversion in which the unit of the value 104 is converted. (5) The DTC decoding is data conversion in which the DTC is decoded and the key 103 and the value 104 are converted into a human-readable message.

Figure 8:
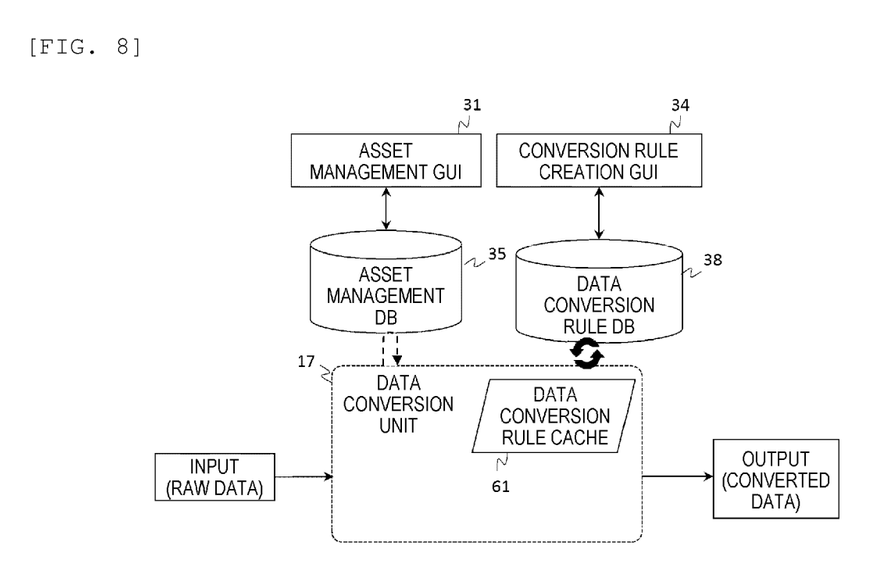
FIG. 8 is a conceptual diagram showing how a data conversion rule is updated.

FIG. 8 is a conceptual diagram showing how the data conversion rule is updated. The update of the data conversion rule is executed in an online state without modifying or deploying the data conversion apparatus 15.

As described above, the asset management data registered by the user from the asset management GUI unit 31 is stored in the asset management DB 35, and the data conversion rule registered by the user from the conversion rule creation GUI unit 34 is stored in the data conversion rule DB 38. The data conversion unit 17 loads the data conversion rule stored in the data conversion rule DB 38 into the cache memory as a data conversion rule cache. The data conversion unit 17 converts the received raw data using the asset management data stored in the asset management DB 35 and the data conversion rule cache 61, and outputs the converted data.

In this state, when the user changes the data conversion rule in the data conversion rule DB 38 from the conversion rule creation GUI unit 34, the data conversion rule DB 38 reflects a content of a changed portion in the data conversion rule cache 61.

As described above, the change of the data conversion rule in the data conversion rule DB 38 and the reflection in the data conversion rule cache 61 are executed without modifying or deploying the data conversion apparatus 15.

In the present embodiment, the data conversion rule registered in the data conversion rule DB 38 is a data set obtained by combining a plurality of individually creatable policy modules that define a data conversion method. The conversion rule creation GUI unit 34 displays the plurality of policy modules on a screen in a manner of being selectable by the user, creates a data set by combining the policy modules selected by the user from the screen, and registers the data set in the data conversion rule DB 38.

Figure 9:
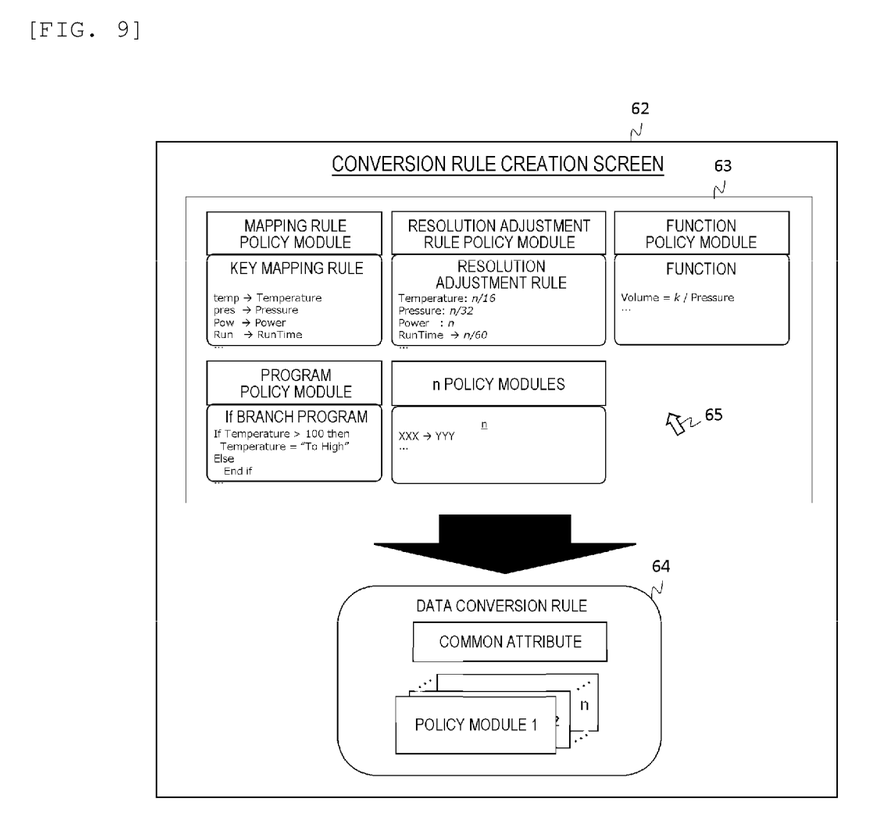
FIG. 9 is a diagram showing an example of a conversion rule creation screen.

FIG. 9 is a diagram showing an example of a conversion rule creation screen. A conversion rule creation screen 62 includes a first screen 63 on which the plurality of policy modules as components of the data conversion rule are displayed and a second screen 64 on which the data conversion rule is created by combining the components. The data conversion rule is created by selecting the policy modules displayed on the first screen 63 and arranging the policy modules on the second screen 64. For example, the user can create the data conversion rule on the second screen 64 by dragging and dropping the policy modules displayed on the first screen 63 to the second screen 64 by a cursor 65.

In the present embodiment described above, the policy module may define a calculation of the data conversion. For example, functions, programs, and the like can be included in a data conversion policy. In this case, a calculation using data of a plurality of items may be defined. A data scientist can confirm a trend in the stored data and set a flexible conversion rule so as to produce a new value from data to be received in the future. For example, when the data scientist creates a data conversion calculation in a familiar programming language (python, or the like), the program can be used immediately as one policy module without modifying or deploying the data conversion apparatus 15. As a result, a new data conversion rule can be immediately applied to the system at any time.

In the present embodiment, the data conversion apparatus 15 specifies the asset 11 from which the data received by the edge device 13 is acquired and specifies the controller type corresponding to the asset 11, but other configurations may also be adopted.

The edge device 13 may store in advance information indicating the controller type representing the type of the controller 12 that controls the asset 11 from which the data received by the edge device 13 is acquired, and transmit the information to the data conversion apparatus 15. The data conversion apparatus 15 may receive the controller type information and the data from the edge device 13, read the conversion rule corresponding to the received controller type from the cache memory, and convert the data using the conversion rule. Since the data conversion apparatus 15 uses the controller type received from the edge device 13, it is not necessary to specify the controller type by referring to the management database 16, thereby enabling faster data conversion.

In the present embodiment, a configuration in which the data conversion apparatus 15 transmits the converted data to the external devices 19 and 21, and the external devices 19 and 21 use the converted data is shown, but the invention is not limited thereto.

As another configuration, the data conversion apparatus 15 itself may use the converted data. For example, in the present embodiment, the data conversion apparatus 15 may be provided with various apps provided in the external device 19, and the processing of these apps may be executed. The data conversion apparatus 15 itself may include a display device to display the converted data.

Although the embodiments of the invention have been described above, the invention is not limited to the embodiments, and the embodiments may be used in combination or a part of the configuration may be changed within the scope of the technical idea of the invention.

The present embodiment and/or the modifications thereof include items to be described below. The items included in the present embodiment and/or the modifications thereof are not limited to the items described below.

(Item 1)

A data conversion apparatus for converting data acquired by an edge device attached to a monitoring target, the data conversion apparatus including:
- a storage unit configured to store monitoring target management information in which the monitoring target is associated with a controller type representing a type of a controller configured to control the monitoring target, and data conversion rule information in which a data set in units of the controller type is registered, the data set in units of the controller type defining a conversion rule indicating a data conversion method for the controller type; and
- a calculation unit including a cache memory and capable of executing a software program for implementing data conversion using the information stored in the storage unit, in which
- the calculation unit loads the data conversion rule information into the cache memory, specifies a monitoring target corresponding to the data received from the edge device, specifies a controller type corresponding to the specified monitoring target by referring to the monitoring target management information, reads a conversion rule corresponding to the specified controller type from the cache memory, and converts the data using the conversion rule.

Accordingly, since the conversion rule indicating the data conversion method is registered as the data set for each controller type, the conversion rule can be flexibly updated in units of the data set. Since the conversion rule is loaded into the cache memory and the conversion rule in the cache memory is used for the conversion of data, rapid data conversion is enabled.

(Item 2)

The data conversion apparatus according to item 1, in which
- the data includes a key indicating an item and a value of the item, and
- the data conversion rule defines that at least one of the key and the value is converted.

(Item 3)

The data conversion apparatus according to item 2, in which
- the data conversion rule defines that the key is converted into a human-understandable phrase or sentence.

Accordingly, the user can read a message and quickly take an appropriate action.

(Item 4)

The data conversion apparatus according to item 2, in which
- the data conversion rule defines that the value is converted into a human-understandable phrase or sentence.

Accordingly, the user can read the message and quickly take an appropriate action.

(Item 5)

The data conversion apparatus according to item 4, in which
- the data conversion rule includes at least one of resolution adjustment, unit addition, unit conversion, and code conversion to a phrase or sentence.

(Item 6)

The data conversion apparatus according to claim 1, in which
- the data conversion rule information is a data set obtained by combining one or more individually creatable policy modules each defining a data conversion method.

The conversion rules corresponding to various assets 11 can be flexibly created by combining a plurality of policy modules. A new conversion rule can be easily created with minor modifications to an existing policy module or conversion rule.

(Item 7)

The data conversion apparatus according to item 6, in which the calculation unit provides a conversion rule creation user interface configured to display the plurality of policy modules in a manner of being selectable by a user, and create the data set by combining the selected policy modules.

(Item 8)

A data conversion system including:
- an edge device provided in a monitoring target and configured to acquire and transmit data related to the monitoring target; and
- a data conversion apparatus configured to receive the data from the edge device and convert the data, in which
- the edge device further transmits a controller type representing a type of a controller configured to control the monitoring target,
- the data conversion apparatus includes
  - a storage unit configured to store data conversion rule information in which a data set in units of the controller type is registered, the data set in units of the controller type defining a conversion rule indicating a data conversion method for the controller type, and
  - a calculation unit including a cache memory and capable of executing a software program for implementing data conversion using the information stored in the storage unit, and
- the calculation unit loads the data conversion rule information into the cache memory, receives the controller type and the data from the edge device, reads a conversion rule corresponding to the received controller type from the cache memory, and converts the data using the conversion rule.

Accordingly, since the data conversion apparatus uses the controller type received from the edge device, it is not necessary to acquire the controller type information from the asset identification information, thereby enabling faster data conversion.

(Item 9)

The data conversion system according to item 8, in which
- the edge device transmits the controller type in the same message as the data, and
- the data conversion apparatus reads a conversion rule corresponding to the controller type included in the message from the cache memory and converts the data using the conversion rule.

Accordingly, since the controller type is received in the same message as the data, the data conversion apparatus does not need to maintain the information in which the monitoring target is associated with the controller type.

REFERENCE SIGNS LIST

11: Asset
12: Controller
13: Edge device
14: Gateway
15: Data conversion apparatus
16: Management database
17: Data conversion unit
18: Data lake
19: External device
20: Message queue 21: External device
22: Display device
31: Asset management GUI unit
32: Device management GUI unit
33: Event management GUI unit
34: Conversion rule creation GUI unit
35: Asset management DB
36: Device management DB
37: Event management DB
38: Data conversion rule DB
39: Processing unit
40: Processing unit
51: Calculation unit
52: Storage unit
53: Communication unit
61: Data conversion rule cache
62: Conversion rule creation screen
63: First screen
64: Second screen

The invention claimed is:

1. A data conversion apparatus for converting data acquired by an edge device attached to a monitoring target, the data conversion apparatus comprising:
a storage unit configured to store monitoring target management information in which the monitoring target is associated with a controller type representing a type of a controller configured to control the monitoring target, and data conversion rule information in which a data set in units of the controller type is registered, the data set in units of the controller type defining a conversion rule indicating a data conversion method for the controller type; and
a calculation unit including a cache memory and capable of executing a software program for implementing data conversion using the information stored in the storage unit, wherein
the calculation unit loads the data conversion rule information into the cache memory, specifies a monitoring target corresponding to the data received from the edge device, specifies a controller type corresponding to the specified monitoring target by referring to the monitoring target management information, reads a conversion rule corresponding to the specified controller type from the cache memory, and converts the data using the conversion rule.

2. The data conversion apparatus according to claim 1, wherein
the data includes a key indicating an item and a value of the item, and
the data conversion rule defines that at least one of the key and the value is converted.

3. The data conversion apparatus according to claim 2, wherein
the data conversion rule defines that the key is converted into a human-understandable phrase or sentence.

4. The data conversion apparatus according to claim 2, wherein
the data conversion rule defines that the value is converted into a human-understandable phrase or sentence.

5. The data conversion apparatus according to claim 4, wherein
the data conversion rule includes at least one of resolution adjustment, unit addition, unit conversion, and code conversion to a phrase or sentence.

6. The data conversion apparatus according to claim 1, wherein
the data conversion rule information is a data set obtained by combining one or more individually creatable policy modules each defining a data conversion method.

7. The data conversion apparatus according to claim 6, wherein
the calculation unit provides a conversion rule creation user interface configured to display the plurality of policy modules in a manner of being selectable by a user, and create the data set by combining the selected policy modules.

8. A data conversion system comprising:
an edge device provided in a monitoring target and configured to acquire and transmit data related to the monitoring target; and
a data conversion apparatus configured to receive the data from the edge device and convert the data, wherein
the edge device further transmits a controller type representing a type of a controller configured to control the monitoring target,
the data conversion apparatus includes
a storage unit configured to store data conversion rule information in which a data set in units of the controller type is registered, the data set in units of the controller type defining a conversion rule indicating a data conversion method for the controller type, and
a calculation unit including a cache memory and capable of executing a software program for implementing data conversion using the information stored in the storage unit, and
the calculation unit loads the data conversion rule information into the cache memory, receives the controller type and the data from the edge device, reads a conversion rule corresponding to the received controller type from the cache memory, and converts the data using the conversion rule.

9. The data conversion system according to claim 8, wherein
the edge device transmits the controller type in the same message as the data, and
the data conversion apparatus reads a conversion rule corresponding to the controller type included in the message from the cache memory and converts the data using the conversion rule.

10. A data conversion method for converting data acquired by an edge device attached to a monitoring target, the data conversion method comprising:
causing a computer including a storage device and a calculation device which includes a cache memory to:
store, into the storage device, monitoring target management information in which the monitoring target is associated with a controller type representing a type of a controller configured to control the monitoring target, and data conversion rule information in which a data set in units of the controller type is registered, the data set in units of the controller type defining a conversion rule indicating a data conversion method for the controller type, and
load the data conversion rule information into the cache memory, specify a monitoring target corresponding to the data received from the edge device, specify a controller type corresponding to the specified monitoring target by referring to the monitoring target management information, read a conversion rule corresponding to the specified controller type from the cache memory, and convert the data using the conversion rule.

* * * * *